(12) United States Patent
Larson

(10) Patent No.: US 8,638,913 B2
(45) Date of Patent: Jan. 28, 2014

(54) SYSTEM AND METHOD FOR ACCESSING A VISUAL PHONE MENU

(75) Inventor: Curt T. Larson, San Francisco, CA (US)

(73) Assignee: RingCentral, Inc., San Mateo, CA (US)

( * ) Notice: Subject to any disclaimer, the term of this patent is extended or adjusted under 35 U.S.C. 154(b) by 73 days.

(21) Appl. No.: 12/789,353

(22) Filed: May 27, 2010

(65) Prior Publication Data

US 2011/0293083 A1  Dec. 1, 2011

(51) Int. Cl.
*H04M 11/00* (2006.01)

(52) U.S. Cl.
USPC ........................................ 379/93.17; 455/566

(58) Field of Classification Search
USPC ............... 379/201.01, 201.02, 201.04, 93.01, 379/93.09, 93.17; 455/466, 566
See application file for complete search history.

(56) References Cited

U.S. PATENT DOCUMENTS

| | | | | |
|---|---|---|---|---|
| 6,104,790 A * | 8/2000 | Narayanaswami | ........ | 379/93.25 |
| 7,095,840 B2 * | 8/2006 | Dezonno et al. | ......... | 379/265.09 |
| 7,130,411 B2 * | 10/2006 | Brown et al. | ............ | 379/266.01 |
| 8,000,454 B1 * | 8/2011 | Or-Bach et al. | ............ | 379/88.18 |
| 8,081,749 B1 * | 12/2011 | Shaffer et al. | ............ | 379/266.01 |
| 8,223,929 B2 * | 7/2012 | Sylvain | ...................... | 379/88.01 |
| 2004/0120479 A1 * | 6/2004 | Creamer et al. | ........... | 379/88.22 |
| 2004/0121814 A1 * | 6/2004 | Creamer et al. | .............. | 455/563 |
| 2006/0099931 A1 * | 5/2006 | Trujillo | ....................... | 455/412.1 |
| 2007/0173237 A1 * | 7/2007 | Roundtree | ................. | 455/414.1 |
| 2007/0280460 A1 * | 12/2007 | Harris et al. | ............. | 379/201.01 |
| 2008/0109226 A1 * | 5/2008 | Gao et al. | ................... | 704/270.1 |
| 2009/0154666 A1 * | 6/2009 | Rios et al. | .................. | 379/88.18 |
| 2009/0154678 A1 * | 6/2009 | Kewin et al. | ............. | 379/201.01 |
| 2009/0202050 A1 * | 8/2009 | Berger et al. | ............. | 379/88.04 |

OTHER PUBLICATIONS

"Using Fonolo," [online] © 2010; Retrieved from the Internet URL: http://fonolo.com/consumer, 1 page.
"What's Fonolo?," [online] © 2010; Retrieved from the Internet URL: http://business.fonolo.com/, 4 pages.
"Automated Phone Trees: Two Potential Solutions," [online] Jul. 5, 2009; Retrieved from the Internet URL: http://developmentality.wordpress.com/2009/07/05/automated-phone-trees-two-potential-solutions/; 3 pages.

* cited by examiner

*Primary Examiner* — Olisa Anwah
(74) *Attorney, Agent, or Firm* — Fish & Richardson P.C.

(57) ABSTRACT

A system and method for providing access to a visual phone menu is disclosed. The system receives a phone number transmitted from a calling device to initiate a call, determines whether a visual phone menu (VPM) is available for the phone number, provides the calling device with a VPM address when a VPM exists, and proceeds with the call from the calling device to the phone number when a VPM does not exist.

22 Claims, 5 Drawing Sheets

SYSTEM AND METHOD FOR ACCESSING A VISUAL PHONE MENU

BACKGROUND

Telephone (phone) menus can be used in a company's telephone system to route callers to a desired department, person, or extension within the company. As an example, a customer calling into a company telephone system may wish to reach a specific department such as sales, technical support, customer service, etc. After pick up, a conventional phone menu can be played to the customer and can include an audio message containing instructions such as "Press or say '1' for sales; press or say '2' for technical support; press or say '3' for customer service", etc. When the customer presses a number on a phone dialpad or speaks the number corresponding to the desired destination, the customer's call is transferred to the selected extension. Phone menus are sometimes referred to as interactive voice response (IVR), auto-attendants, or phone trees.

Listening to a phone menu can be an annoyance for many customers. Some companies now offer visual phone menus that can be viewed by their customers in an internet browser. The visual phone menu allows the customer to avoid listening to the dreaded phone menu. Typically, the visual phone menu provides a short description of available departments in the company and an associated hyperlink. The customer views the available departments in the browser and selects a desired department that the customer wishes to call. The customer may also enter a contact number for callback. The customer is called back at the provided contact number and thereby connected to the selected department.

Customers calling into a conventional company phone system will only hear a conventional phone menu—unless otherwise informed, such callers would not be aware that a visual phone menu was available. Furthermore, a customer who wishes to access a company's visual phone menu must initiate a visit themselves using an internet browser.

SUMMARY

In some implementations, a method for providing access to a visual phone menu includes receiving a phone number transmitted from a calling device to initiate a call, determining whether a visual phone menu (VPM) is available for the phone number, providing the calling device with a VPM address when a visual phone menu exists, and proceeding with the call from the calling device to the phone number when a visual phone menu does not exist.

In some implementations, a method performed by VPM client software installed on a calling device includes receiving a phone number dialed by a caller, sending the phone number for lookup in a VPM directory to determine if a visual phone menu is available for the phone number, receiving a VPM address for a VPM server when a visual phone menu is available for the phone number, and requesting a visual phone menu from the VPM server located at the VPM address.

In some implementations, a system for providing access to a visual phone menu includes a VPM gateway to receive a phone number from a calling device and to look up a VPM address for the phone number in a VPM directory. The VPM gateway provides the VPM address to the calling device. The system also includes a VPM server located at the VPM address. The VPM server provides a visual phone menu having selectable callees to a client device and receives a call request from the client device. The call request includes a selected callee. The system also includes a telephony server to fulfill the call request.

BRIEF DESCRIPTION OF THE DRAWINGS

Like reference symbols in the various drawings indicate like elements.

DETAILED DESCRIPTION

A visual phone menu is made more accessible by phone by using, for example, a visual phone menu (VPM) gateway and a VPM directory. By way of example, a caller dials a phone number which initiates a call to a hosted PBX. The phone number is received by a VPM gateway. The VPM gateway looks up the phone number in a VPM directory. If a visual phone menu exists for the phone number, the caller is provided a VPM address. The caller requests the visual phone menu from the VPM address. The visual phone menu is provided to the caller by a VPM server and includes selectable callees. The caller selects a callee and sends a call request including the selected callee) to the hosted PBX. The call request is completed by the hosted PBX.

Terminology

Hosted Private Branch Exchange (PBX): A hosted PBX (also known as a virtual PBX or a cloud-based PBX) provides PBX functionality and other telephony services to subscribers from remote servers. The hosted PBX services can be delivered over packet-switched networks, such as the Internet, over traditional circuit-switched networks, such as the Public Switched Telephone Network (PSTN), or over a combination of both. In contrast, a conventional on-premise PBX requires that dedicated hardware be physically installed on customer premises. Each subscriber to a hosted PBX has an account associated with at least one primary phone number.

Voice over Internet Protocol (VoIP): The transmission of voice communications and other phone services in packet format over a packet-switched network such as the Internet. In contrast, conventional phone services are delivered over the public switched telephone network (PSTN).

Telephony: The use of equipment to transfer voice, text, and facsimile communications across a distance. This includes transfers across packet-based or IP networks; across circuit-switched networks such as the public switched telephone network (PSTN); and across cellular or wireless networks which may overlap with packet-based or circuit-switched networks.

Smartphone: A mobile phone capable of providing both telephony and data services. Telephony services can include voice and SMS messaging. Data services include but are not limited to email and internet browsing. A smartphone typically has the capability to connect to both a cellular network and a wireless local access network.

Softphone: A software application on a computer enabling the computer to provide telephony services.

System Overview

Figure 1:
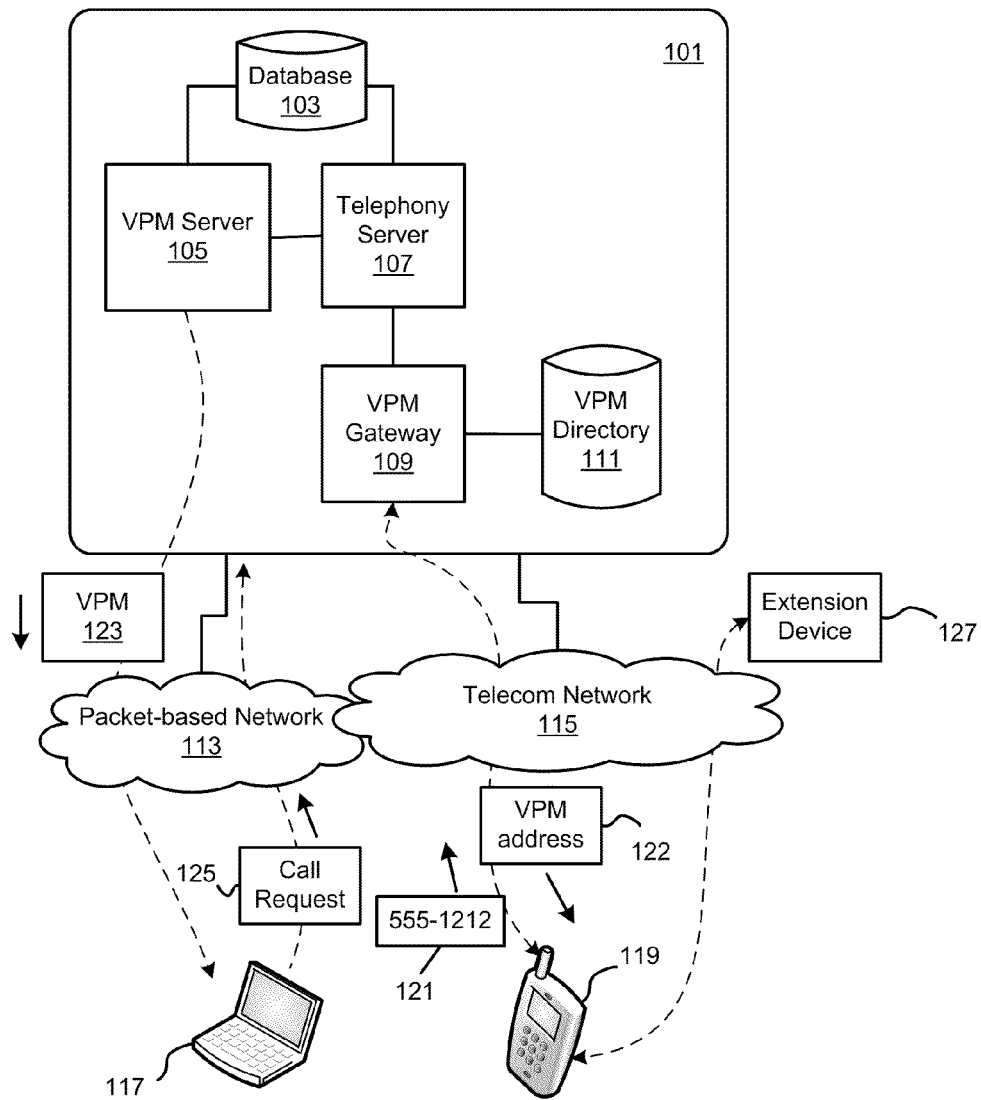
FIG. 1 shows an example of a system for accessing a visual phone menu.

FIG. 1 shows an example of a system for accessing a visual phone menu. A hosted PBX 101 is coupled to a packet-based network 113 and a telecommunications ("telecom") network 115. The packet network 113 carries data in packetized form over a packet-switched network (e.g., the Internet) and can include local area networks (LAN), wide area networks (WAN), wireless LANs, WiMax networks, etc. The telecom network 115 carries voice communications and includes public switched telephone networks (PSTN), cellular networks, VoIP networks, etc. As indicated in FIG. 1, there is some overlap between the telecom network 115 and the packet network 113 since VoIP communications are also packetized and carried over the Internet. The hosted PBX 101 communicates with and provides services to a client device 117 and a calling device 119. The client device 117 can be of the form of any internet-enabled computing device that has a display for displaying information received over the Internet. The calling device 119 can be of the form of a telephony device such as a cellphone, smartphone, softphone, landline phone, VoIP phone, etc.

The hosted PBX 101 includes a database 103, a VPM server 105, a telephony server 107, a VPM gateway 109, and a VPM directory 111. It should be noted that while the components in the hosted PBX 101 are shown as separate modules in FIG. 1, one or more of these components can be combined or co-located (e.g., into and located in the same physical server or rack).

The database 103 stores account configuration information, such as call answering rules, call routing rules, billing information, etc. The database 103 also stores extension information that is needed to create a conventional or visual phone menu, such as the extension number (e.g. ext. 101) and a name for the extension (e.g. department or person's name). Typically, a subscriber to the hosted PBX 101 has at least one primary phone number associated with an account, and the primary phone number can be associated with one or more extensions that can be configured to point to any of the subscriber's devices. The subscriber's devices may have their own phone number ("secondary phone number") as well. In some implementations, the primary phone number is provided by the subscriber as a main contact number for the subscriber's company. An exemplary extension device 127 associated with a primary phone number is shown in FIG. 1. The exemplary extension device 127 may have its own secondary phone number as well.

The VPM server 105 provides a visual phone menu 123 to a client device 117. The content in the visual phone menu (e.g. department name, etc.) can be based on or derived from the account configuration information stored in the database 103. The telephony server 107 provides telephony services such as answering inbound calls, making outbound calls, bridging calls, playback, call recording, and voicemail, among other things.

The calling device 119 initiates a call by calling a phone number 121 (e.g. "555-1212"). The VPM gateway 109 receives the called number from the calling device 119 over the telecom network 115. The VPM gateway 109 determines if a visual phone menu is available for the called number. The VPM gateway 109 looks up the called number in the VPM directory 111. The VPM directory 111 stores information including phone numbers, whether a visual phone menu exists for that phone number, and the address of the visual phone menu (e.g. a uniform resource locator, "URL"), if one exists.

Table 1 below is an example of the information that can be found in the VPM directory 111.

TABLE 1

| Number | VPM? | VPM address |
|---|---|---|
| 555-1212 | Yes | www.companyA.com/vpm/subscriber |
| 555-5678 | No | — |
| 555-2222 | Yes | www.companyB.com/vpm |
| 555-3434 | Yes | 199.239.136.200 |

The first column of Table 1 ("Number") contains the primary phone numbers associated with each account on the hosted PBX 101. The second column ("VPM?") indicates whether the phone number has a visual phone menu associated with it. A "yes" indicates that a visual phone menu exists for that particular phone number; a "no" indicates that a visual phone menu is not provided. The third column ("VPM address") contains the address for the visual phone menu if one exists. The VPM address can be a uniform resource locator (URL) or an internet protocol (IP) address for the VPM server 105. The VPM address can also point to an address external to the hosted PBX 101. The information in Table 1 can be compiled by the hosted PBX 101, using information in its database 103 regarding its subscribers, the primary phone numbers associated with the subscriber accounts, and whether those subscribers have set up a visual phone menu to provide to their callers. The VPM directory 111 can also be hosted by an organization separate from the hosted PBX 101. For example, the VPM directory 111 can be a separate directory service operated by a third-party company that collects and maintains the data regarding phone numbers and corresponding visual phone menus, similar to an online phone book or yellow pages directory.

Example Process

Figure 2:
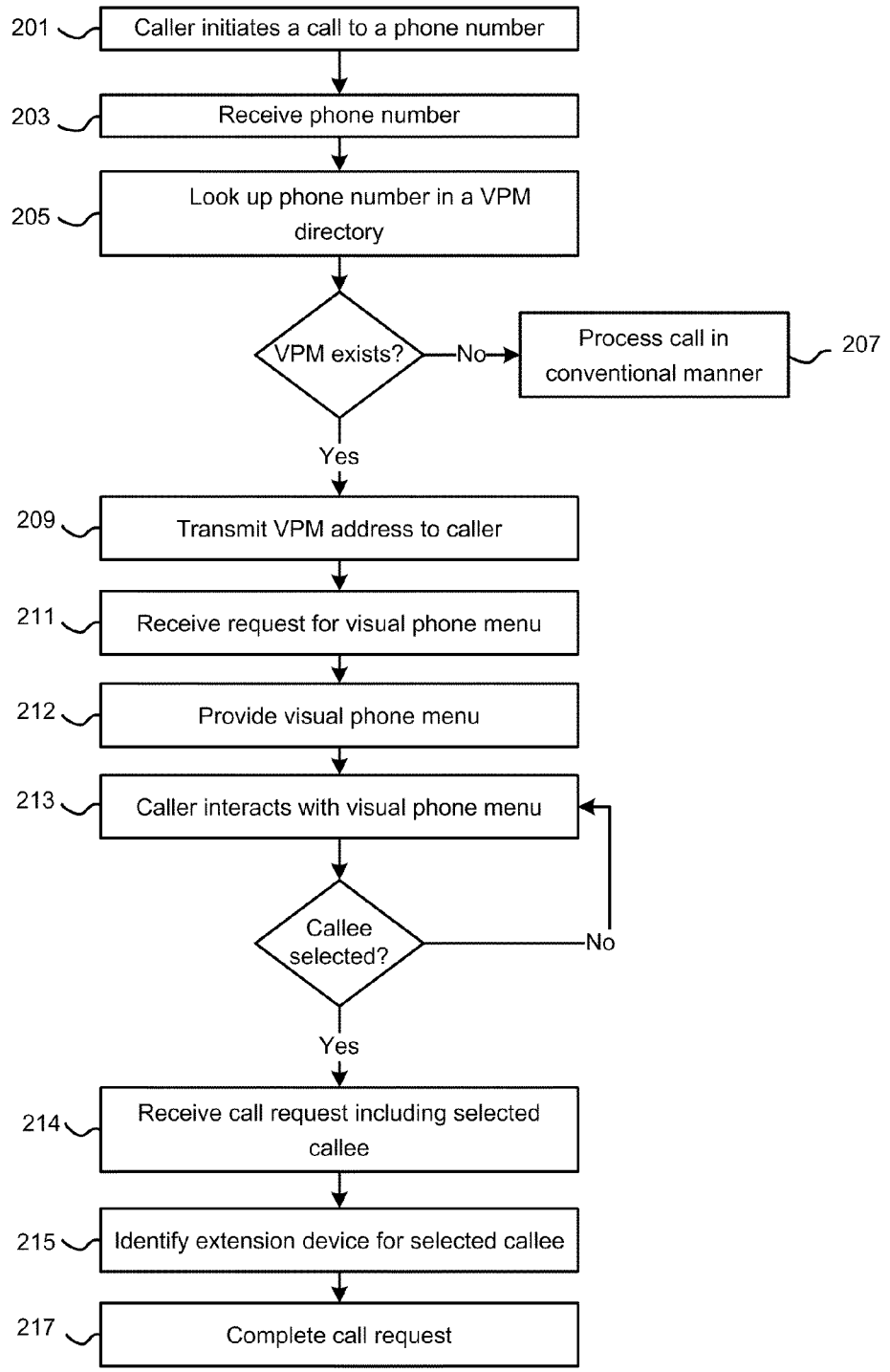
FIG. 2 is a flow chart illustrating an example process for providing access to a visual phone menu.

FIG. 2 is a flow chart illustrating an example process for providing access to a visual phone menu. For the purposes of this example, a subscriber is someone who has an account with the hosted PBX. A caller is someone who is calling the subscriber or the subscriber's company, by calling a primary phone number for the subscriber's account. The caller may be a customer of the subscriber or the subscriber's company. A callee is the department, person, or extension that a caller calls.

In step 201, a caller initiates a call to a phone number. For example, a caller can use a calling device 119 to dial or entering a phone number 121 ("555-1212"). The phone number 121 corresponds to a primary phone number for an account on the hosted PBX 101.

In step 203, the phone number is received. For example, the VPM gateway 109 receives the phone number 121 from the calling device 119.

In step 205, a lookup is performed for the called number. For example, the VPM gateway 109 can do a lookup in the VPM directory 111 for the phone number 121. The entry for phone number 121 ("555-1212") is found in the first row in Table 1 (which is an exemplary representation of the information found in the VPM directory 111). A corresponding visual phone menu does exist for this phone number (VPM="yes") and the VPM address is "www.companyA.com/vpm/subscriber".

In step 207, when no visual phone menu is found for the called number, or if the called number is not found (e.g., not located in the VPM directory 111), the call is processed conventionally (e.g., the call is handled by the telephony server 107 and the calling device 117 is connected in a conventional manner to a conventional phone menu or other answering telephony device).

In step 209, when a visual phone menu corresponding to the called number is found, an address for the visual phone menu is transmitted to the caller. For example, the VPM gateway 109 can transmit the VPM address 122 (e.g. a URL or IP address) to the calling device 119. In some implementations, the VPM gateway 109 sends a short message service (SMS) message back to the calling device 119 with the VPM address contained within the message. The calling device 119 must be able to receive SMS messages. In some implementations, the VPM gateway 109 can play back an audio message of the VPM address 122 to the calling device 119 for the caller to listen to.

In some implementations, the calling device 119 is presented with an option to be diverted to the visual phone menu, or to continue with completing the call in a conventional manner. The option can be presented as an interactive voice response, for example: "Press or say '1' to access a visual phone menu. Press or say '2' to continue and hear a phone menu." This option is especially useful for callers with impaired or no vision who are unable to use a visual phone menu.

In step 211, a request is received for the visual phone menu. For example, the VPM server 105 receives a request from the client device 117 at the VPM address 122 provided by the VPM gateway 109. In some implementations, the calling device 119 is also an internet-enabled computing device with a display (e.g. a smartphone, softphone, and other VoIP phones), in which case the caller can connect to the VPM address 122 directly from the calling device 119 as well. In this scenario, the calling device 119 and the client device 117 can be one and the same device.

In some implementations, the calling device 119 can display the VPM address 122 in an SMS message as a hyperlink. The caller can select the hyperlink (using, for example, a pointer or a touch interface on the calling device 119), which can automatically open a browser window on the calling device 119 to the VPM address.

In step 212, a visual phone menu is provided to the caller. For example, the VPM server 105 can provide the visual phone menu 123 to the client device 117. In some implementations, the visual phone menu 123 is provided in a markup language. Suitable markup languages include hypertext markup language (HTML), standard generalized markup language (SGML), extensible markup language (XML), etc.

Figure 3A:
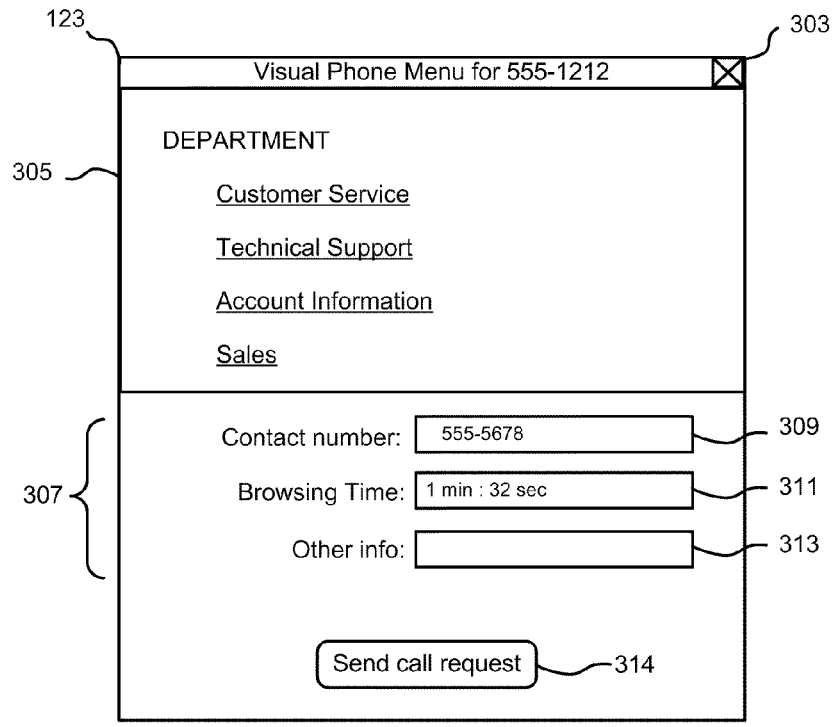
FIGS. 3A-3B show examples of a visual phone menu for a phone number as it might appear on a display of a client device.

FIG. 3A shows an exemplary visual phone menu 123 for the phone number "555-1212" as it might appear on a display of the client device 117. The visual phone menu 123 appears in an application window 303 such as a browser. The visual phone menu 123 includes, for example, a callee section 305, an information section 307, and a send call request button 314. The callee section 305 lists the callees available to call. The callees shown in the visual phone menu 123 are departments, but any other callees (such as names, extensions, functions, titles, etc.) can be listed. The listed callees are selectable by the caller, meaning that they are selectable through a user input interface such as a touchscreen, input keys, pointer, etc. For example, in FIG. 3 the department names are hyperlinked, and selecting a department (e.g. clicking on the department with a pointer) can initiate a call request. Alternative means of selection include providing checkboxes, radio buttons, highlighting, etc.

The information section 307 can include additional information that the caller sends back to the VPM server 105 when initiating a call request. In some implementations, the caller enters a contact number 309 for a calling device where the caller wants to complete the call. Alternatively, other data for contacting the caller can be provided. The caller can enter the number of the calling device 119, or the caller can enter the number of another calling device altogether. In some implementations, a number for the client device is automatically detected and provided as the contact number 309.

Other optional information may be included by the caller in section 307. For example, a timer 311 may be included that tracks the amount of time the caller spends perusing the visual phone menu 123 before making a selection. The VPM server 105 can use the timer 311 information to credit the caller with time spent in a call queue. A field 313 can be used to enter many other kinds of information. For example, field 313 can be used to enter a caller's name, a caller's reason for calling, caller account numbers, etc. A caller could also upload a file in this field. A caller can also indicate a preference as to how the call request should be completed. For example, the caller may wish to be connected immediately to the selected callee. Or, the caller may wish to complete the call at some time in the future, and can enter a later time when the call should be returned.

Once the caller has identified and selected a callee from the visual phone menu, the caller sends a call request to the hosted PBX 101 to connect to the callee. The caller sends a call request to be connected to the selected callee, for example, by selecting "send call request" button 314. There are various other ways for a caller to enter additional information and send a call request. For example, the visual phone menu can provide pop-up windows for entering additional information or for sending a call request.

Figure 3B:
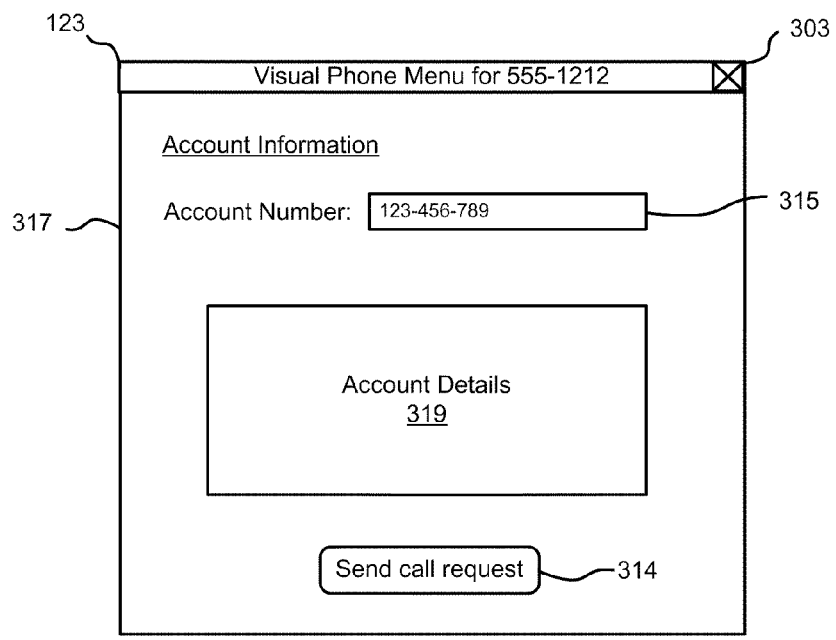

Due to its interactive nature, a visual phone menu can provide and receive more information than would be the case for a conventional phone menu. For example, the visual phone menu can be designed to provide detailed system status information, frequently asked questions, search functionality, etc. The interactive nature of a visual phone menu allows customized information to be provided to a caller as well. For example, FIG. 3B shows an expanded view when the department "Account Information" is selected from FIG. 3A. The account section window 317 has a field 315 for a caller to enter an account number, and a section 319 for account details displaying customized information based on the caller's entered account number, such as account balances, account preferences, history of transactions, etc. The caller can also connect to this department by clicking on send call request button 314. The information provided by the caller can be stored for reference and to maintain a caller history, so that future visits or calls by the same caller can be addressed more efficiently.

Returning to the flowchart in FIG. 2, in step 213, the caller interacts with the visual phone menu. For example, this includes viewing the information provided in the visual phone menu, entering information into the visual phone menu, etc. Caller continues to interact with the visual phone menu until the caller selects a callee and sends a call request.

In step 214, a call request is received which includes the selected callee. For example, the hosted PBX 101 receives a call request 125. The call request can include a number for the calling device 119 and the selected callee from the visual phone menu (e.g., visual phone menu 123).

In step 215, the extension for the selected callee is identified. The hosted PBX 101 can identify the extension for the caller's selected callee and the associated extension device 127 to be contacted. The extensions and their associations can be configured by the subscriber. For example, the subscriber may configure an extension to be directed to any one of a number of devices, such as a mobile phone, a landline phone, a VoIP phone, a computer softphone, etc.

In step 217, the call request is completed. For example, the VPM server 123 and/or the database 103 can provide the telephony server 107 with the phone numbers for both the calling device 119 and the extension device 127. The telephony server 107 can connect the calling device 119 and the extension device 127 in a call.

The call request can be completed in different ways, depending on how the hosted PBX 101 is set up to handle call requests, or on preferences submitted by the caller in the call request. The call request can be treated as an initiation of a call placed by the calling device 119. The call is completed by connecting calling device 119 to the extension device 127 directly upon receipt of the call request by the telephony server 107.

The call request can also be treated as a "callback". In a callback, the telephony server 107 calls the calling device 119 and connects it to the extension device 127 in a call. Generally, the calling device 119 will ring (or otherwise alert the caller that a call has arrived) and the caller will need to answer the call to be connected to the extension device 127. From the viewpoint of the caller in this scenario, it appears as if the extension device 127 has called the caller back. In some implementations, this callback happens after some time has passed since the call request was received. For example, completion of the call request may be delayed because it is put into a queue to be completed later when the call request has moved to the front of the queue, or because the caller has requested completion to happen at a future time, or because completion is just delayed.

Calling Device with VPM Client Software Installed

Figure 4:
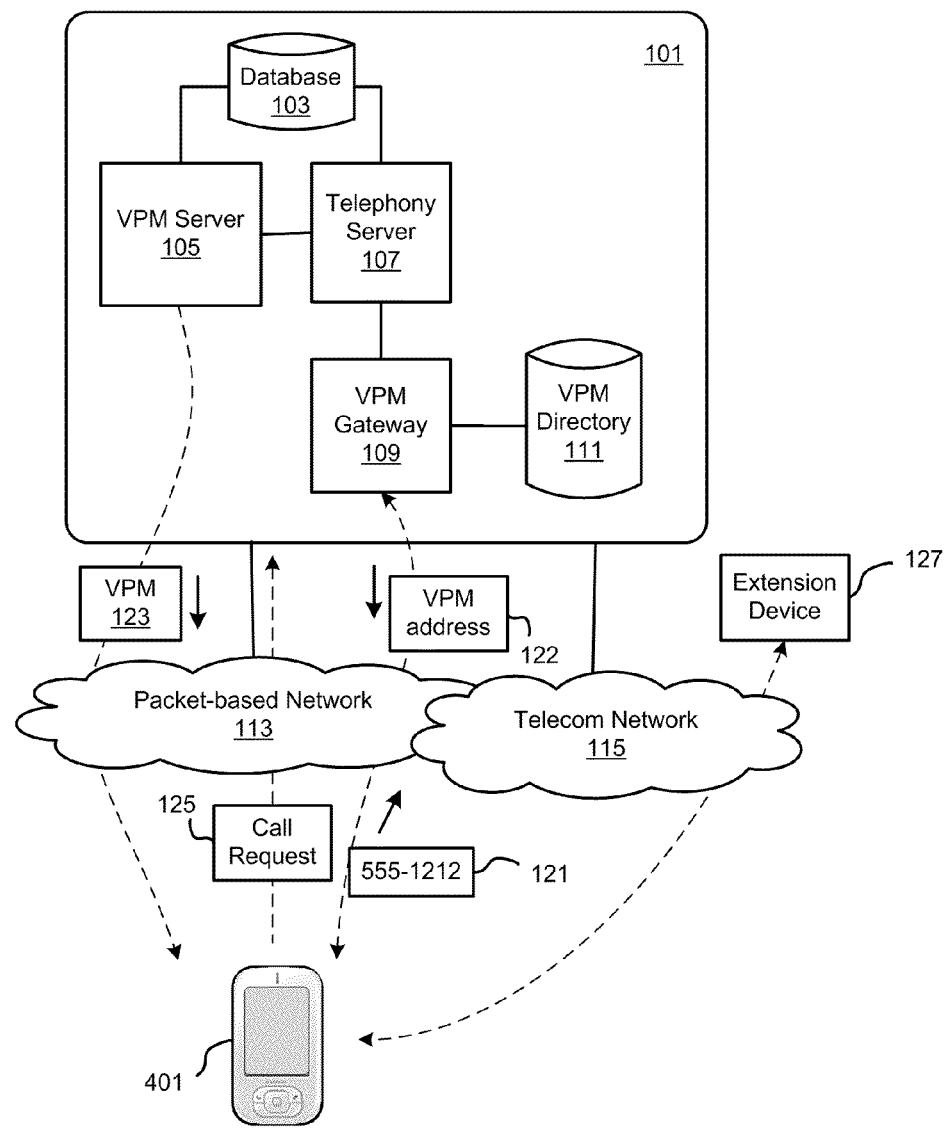
FIG. 4 shows an example of a system for accessing a visual phone menu.

In some implementations, a calling device can be installed with VPM client software that facilitates the process of calling a number and accessing a visual phone menu. FIG. 4 shows an example of a system for accessing a visual phone menu with a calling device 401. The calling device 401 can be, for example, a smartphone, a softphone, or similar computing or non-computing device with a processor having telephony capability and internet access. As further illustration, the VPM client software can be an application (often referred to as an "app") installed on an Apple iPhone™, a phone running on the Windows™ or Android™ platform, or any other suitable smartphone.

The calling device 401 has VPM client software installed. The VPM client software (also referred to as "VPM client" herein) allows the calling device 401 to initiate a call, access a visual phone menu, make a selection from the visual phone menu, and complete a call to the selected extension, all from the same calling device. A caller using calling device 401 initiates a call request by providing (e.g. entering or dialing) a phone number 121. The calling device 401 sends the call request to the VPM gateway 109 via the packet-based network 113. The VPM gateway 109 looks up the phone number 121 in the VPM directory 111 and returns a VPM address 122 to the calling device 401 if one is found.

The calling device 401 requests a visual phone menu from the VPM server 105 at the VPM address 122. The VPM server 105 returns the visual phone menu 123 to the calling device 401. The caller selects a callee from the visual phone menu 123 and sends a call request 125 to the VPM server 105. The call request 125 includes a contact number for the caller and the caller's selected callee. The telephony server 107 completes the call request 125 and connects the calling device 401 with a selected extension device 127.

Figure 5:
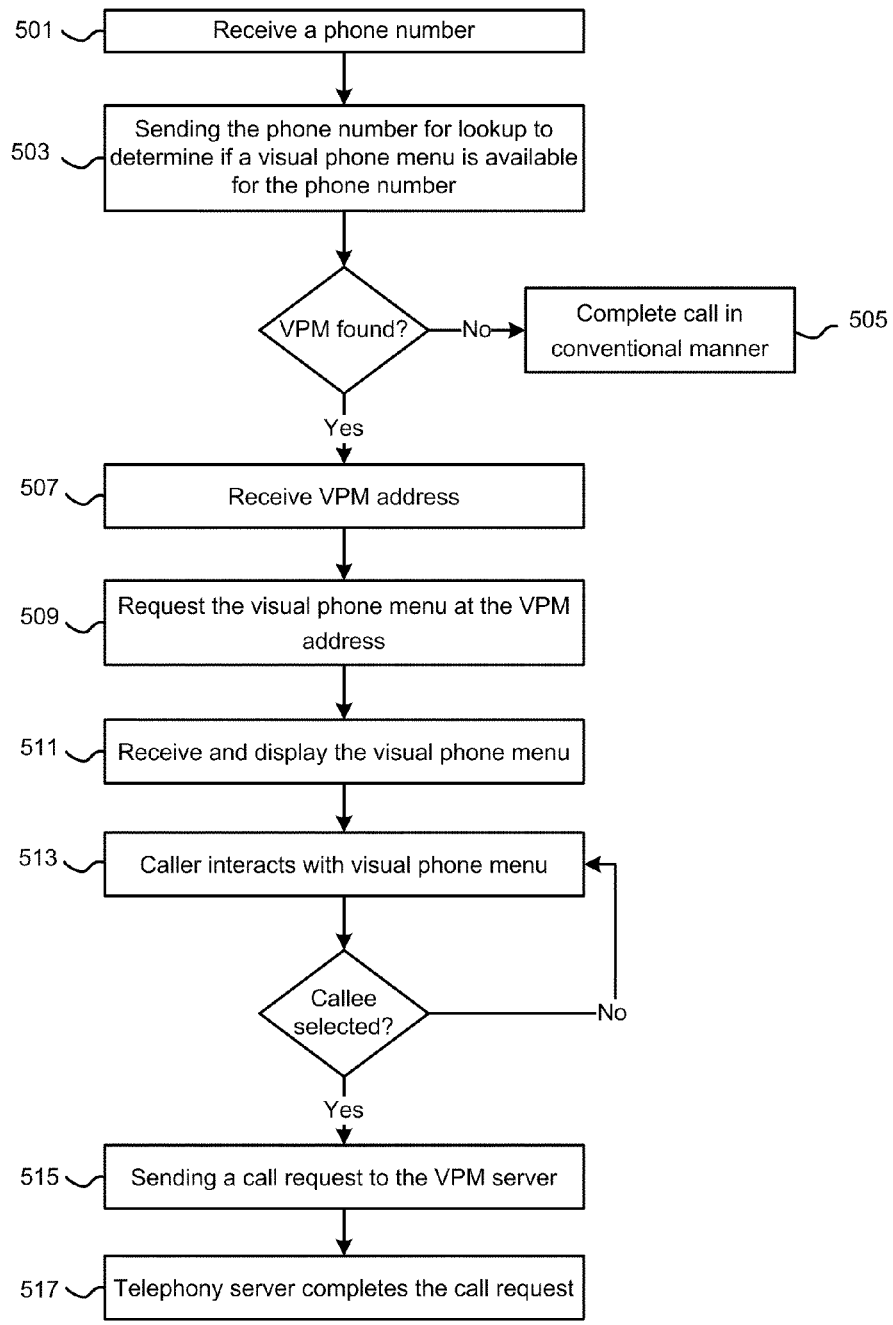
FIG. 5 is a flow chart illustrating an example process for VPM client software.

FIG. 5 is a flow chart illustrating an example process for VPM client software (also referred to as "VPM client" herein) installed on a calling device.

In step 501, a number dialed by a caller is received.

In step 503, the number is sent as part of a query to determine if a visual phone menu is available for the received number. For example, the VPM client can send the query to a VPM gateway 109 as described above, or to any other provider of a VPM directory.

In step 505, when no visual phone menu is found for the received number, or the received number is not found, the call is processed conventionally. For example, the VPM client can complete the call to the entered number in a conventional manner.

In step 507, when a visual phone menu is found for the called number, the results returned for the search query include an address for the visual phone menu. For example, the VPM client can receive the VPM address from the hosted PBX or other provider for the VPM directory.

In step 509, the visual phone menu is requested using the address. For example, the VPM client can request the visual phone menu from the VPM server located at the VPM address. The VPM client can maintain control of displaying the visual phone menu, e.g. the visual phone menu is presented in a display window operated by the VPM client. In some implementations, the VPM client can start up a separate browser application installed on the calling device with the VPM address, and relinquish control to the browser application. The use of a browser application to view the visual phone menu has already been described above, so the remaining steps will be described with the assumption that the VPM client maintains control.

In step 511, the visual phone menu is received and displayed to the user. For example, the VPM client can receive the visual phone menu from the VPM server and display it.

In step 513, the caller interacts with the visual phone menu. For example, this includes viewing the information provided in the visual phone menu, entering information into the visual phone menu, etc. Caller continues to interact with the visual phone menu until the caller selects a callee (e.g. department, individual, extension, etc.) and sends a call request When sending the call request, the caller may not have to enter a contact number for the calling device 401, since the VPM client can determine the number for the calling device where it is installed. In this scenario, the VPM client can do an auto-detect of the calling device's number. However, in case the caller wishes to be called back at a different device than the one where the VPM client resides, the visual phone menu can still prompt the caller to enter an optional number at which to be called.

In step 515, a call request is formatted and sent off for processing. For example, the VPM client can send a call request to the VPM server. The call request can include the caller's selected callee and the caller's number. The VPM server (or the telephony server) identifies the appropriate extension device 127 corresponding to the caller's selected callee.

In step 517, the call request is completed and the calling device is connected to the appropriate contact. The call request can be completed in different ways, depending on how the hosted PBX 101 is set up to handle call requests, or on preferences submitted by the caller in the call request. The call request can be treated as an initiation of a call placed by the calling device 119. The call is completed by connecting calling device 119 to the extension device 127 directly upon receipt of the call request by the telephony server 107.

The call request can also be treated as a "callback". In a callback, the telephony server 107 calls the calling device 119 and connects it to the extension device 127 in a call. Generally, the calling device 119 will ring (or otherwise alert the caller that a call has arrived) and the caller will need to answer the call to be connected to the extension device 127. From the viewpoint of the caller in this scenario, it appears as if the extension device 127 has called the caller back. In some implementations, this callback happens after some time has passed since the call request was received. For example, completion of the call request may be delayed because it is put into a queue to be completed later when the call request has moved to the front of the queue, or because the caller has requested completion to happen at a future time, or because completion is just delayed.

VPM for a Desktop VoIP Device with Display

Some desktop VoIP phones are available with display screens that can be programmed to display customized information. In some implementations, a visual phone menu is provided in a format that can be interpreted by a desktop VoIP phone. A markup language can be developed for the visual phone menu to provide a standard interface accessible by desktop VoIP phone menus. Alternatively, a standard application programming interface (API) can be defined for the VPM server to interact with desktop VoIP phones. Similar to HTML, the visual phone menu markup can include request and response functionality to interact with the calling party and provide dynamic content.

Although the present invention has been described in detail with reference to particular embodiments, persons possessing ordinary skill in the art to which this invention pertains will appreciate that various modifications and enhancements may be made without departing from the spirit and scope of the claims that follow.

What is claimed is:

1. A method comprising:
    receiving a phone number transmitted from a calling device to initiate a call;
    determining that a visual phone menu (VPM) is available for the phone number;
    providing an option for a caller to select between receiving a VPM address associated with the VPM or continuing to listen to a conventional phone menu;
    providing a client device with the VPM address when the caller selects receiving the VPM address including:
        playing back an audio message which states the VPM address;
        providing the VPM to a client device using the VPM address, the VPM including one or more selectable callees,
        receiving a call request from the client device, the call request including a selected callee from the VPM, and completing the call request to the selected callee; and
    proceeding with the call from the calling device to the phone number when the caller selects to continue to listen to the conventional phone menu.

2. A method as in claim 1, wherein the phone number is a primary phone number associated with an account on a hosted PBX.

3. A method as in claim 1, wherein the VPM address is a uniform resource locator (URL) or an internet protocol (IP) address that belongs to a VPM server.

4. A method as in claim 1, wherein providing the calling device with a VPM address comprises:
    sending the calling device a short message service (SMS) message for the VPM.

5. A method as in claim 1, wherein the visual phone menu is provided in a markup language.

6. A method as in claim 5, wherein the markup language is a proprietary markup language adapted for desktop voice over internet protocol (VoIP) phones.

7. A method as in claim 1, wherein determining that a visual phone menu is available comprises:
    looking up the phone number in a VPM directory that stores a plurality of phone numbers and any associated VPM addresses.

8. A method as in claim 1, wherein completing the call request comprises:
    identifying an extension device associated with the selected callee from the visual phone menu; and
    connecting the extension device to the calling device in a call.

9. A method as in claim 8, wherein the calling device and the client device are a same device.

10. A method as in claim 1, further comprising;
    placing the call request into a call queue;
    waiting until the call request has moved to a front of the call queue before connecting an extension device associated with the selected callee and the calling device.

11. A non-transitory computer-readable medium storing a computer program which, when executed by a computer processor, causes the computer processor to perform operations comprising:
    receiving a first call from a caller intended for a first phone number;
    displaying a visual phone menu (VPM) for the first phone number, the VPM for the first phone number having one or more selectable callees each corresponding to a respective extension and an input field for receiving an input from the caller;
    receiving a selected callee and additional caller information entered into the input field from the caller;
    sending a call request to the VPM server, the call request including the selected callee and the additional caller information entered by the caller into the input field of the VPM;
    storing the first phone number and the additional caller information in a caller history for the caller;
    receiving a second call from the caller intended for the first phone number; and
    displaying the VPM with customized information from the caller history for the caller, the customized information including the additional caller information previously received from the caller during the first call.

12. A non-transitory computer-readable medium as in claim 11, wherein the call request includes a callback number entered by the caller.

13. A non-transitory computer-readable medium as in claim 11, wherein the call request includes a contact number for the caller that is automatically detected.

14. A non-transitory computer-readable medium as in claim 11, wherein the additional caller information received from the caller includes at least one of a name of the user, an account number of the caller, or a reason for calling.

15. A method comprising:
    receiving a first call from a caller intended for a first phone number;
    displaying a visual phone menu (VPM) for the first phone number, the VPM for the first phone number having one or more selectable callees each corresponding to a respective extension and an input field for receiving an input from the caller;
    receiving a selected callee and additional caller information entered into the input field from the caller;
    sending a call request to the VPM server, the call request including the selected callee and the additional caller information entered by the caller into the input field of the VPM;

storing the first phone number and the additional caller information in a caller history for the caller;

receiving a second call from the caller intended for the first phone number; and displaying the VPM with customized information from the caller history for the caller, the customized information including the additional caller information previously received from the caller during the first call.

16. A method as in claim 15, wherein the call request includes a callback number entered by the caller.

17. A method as in claim 15, wherein the call request includes a contact number for the caller that is automatically detected.

18. A method as in claim 15, wherein the additional caller information received from the caller includes at least one of a name of the user, an account number of the caller, or a reason for calling.

19. A system comprising one or more computers and one or more storage devices storing instructions that, when executed by the one or more computers, cause the one or more computers to perform operations comprising:

receiving a first call from a caller intended for a first phone number;

displaying a visual phone menu (VPM) for the first phone number, the VPM for the first phone number having one or more selectable callees each corresponding to a respective extension and an input field for receiving an input from the caller;

receiving a selected callee and additional caller information entered into the input field from the caller;

sending a call request to the VPM server, the call request including the selected callee and the additional caller information entered by the caller into the input field of the VPM;

storing the first phone number and the additional caller information in a caller history for the caller;

receiving a second call from the caller intended for the first phone number; and displaying the VPM with customized information from the caller history for the caller, the customized information including the additional caller information previously received from the caller during the first call.

20. A system as in claim 19, wherein the call request includes a callback number entered by the caller.

21. A system as in claim 19, wherein the call request includes a contact number for the caller that is automatically detected.

22. A system as in claim 19, wherein the additional caller information received from the caller includes at least one of a name of the user, an account number of the caller, or a reason for calling.

* * * * *

UNITED STATES PATENT AND TRADEMARK OFFICE
CERTIFICATE OF CORRECTION

| | | |
|---|---|---|
| PATENT NO. | : 8,638,913 B2 | Page 1 of 1 |
| APPLICATION NO. | : 12/789353 | |
| DATED | : January 28, 2014 | |
| INVENTOR(S) | : Larson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 146 days.

Signed and Sealed this
Sixteenth Day of June, 2015

Michelle K. Lee
*Director of the United States Patent and Trademark Office*